United States Patent [19]

Wegemund et al.

[11] 4,096,323
[45] Jun. 20, 1978

[54] ANAEROBICALLY HARDENING ADHESIVES AND SEALANTS BASED ON (METH)ACRYLIC ESTERS CONTAINING REACTION PRODUCTS OF GLYCIDYL(METH)ACRYLATE AND HALF ESTERS OF DICARBOXYLIC ACIDS

[75] Inventors: Bernd Wegemund, Haan; Werner Gruber, Dusseldorf-Gerrescheim; Joachim Galinke, Langenfeld, all of Germany

[73] Assignee: Henkel Kommanditgesellschaft auf Aktien, Dusseldorf-Holthausen, Germany

[21] Appl. No.: 770,381

[22] Filed: Feb. 22, 1977

[30] Foreign Application Priority Data

Feb. 27, 1976 Germany ............................ 2607962

[51] Int. Cl.$^2$ .......................... C08F 4/32; C08F 2/00; C08F 210/00; C08F 20/06
[52] U.S. Cl. .................................... 526/317; 260/836; 260/802; 526/11.1; 526/219; 526/230; 526/270; 526/271; 526/273; 526/318

[58] Field of Search ............... 526/270, 273, 271, 11.1, 526/75, 317, 318

[56] References Cited

U.S. PATENT DOCUMENTS

| | | | |
|---|---|---|---|
| 3,784,525 | 5/1974 | Baumann et al. | 526/75 |
| 3,843,594 | 10/1974 | Labana et al. | 526/273 |
| 3,919,345 | 11/1975 | Labana et al. | 260/836 |
| 3,925,507 | 12/1975 | Katsimbas | 526/273 |
| 3,959,405 | 5/1976 | Lababa et al. | 260/836 |
| 3,971,765 | 7/1976 | Green et al. | 526/271 |
| 3,974,128 | 8/1976 | Block et al. | 526/271 |
| 3,989,679 | 11/1976 | Sluis et al. | 260/78.41 |
| 3,997,627 | 12/1976 | Ichimura et al. | 260/862 |
| 4,007,322 | 2/1977 | House | 526/320 |
| 4,007,323 | 2/1977 | Malofsky | 526/320 |

*Primary Examiner*—Herbert J. Lilling
*Attorney, Agent, or Firm*—Hammond & Littell

[57] ABSTRACT

Reaction products of glycidyl (meth)acrylate with linear half esters of dicarboxylic acids are components of anaerobically-setting adhesive compositions based on (meth)acrylic esters and organic peroxides.

13 Claims, No Drawings

ANAEROBICALLY HARDENING ADHESIVES AND SEALANTS BASED ON (METH)ACRYLIC ESTERS CONTAINING REACTION PRODUCTS OF GLYCIDYL(METH)ACRYLATE AND HALF ESTERS OF DICARBOXYLIC ACIDS

FIELD OF THE INVENTION

The present invention relates to anaerobically hardening adhesives, sealing compounds, etc., based on mixtures of (meth)acrylic esters, which may be optionally substituted, and organic peroxides, particularly hydroperoxides. More specifically, it relates to compositions which harden rapidly in the absence of oxygen, based on (meth)acrylic esters and organic peroxides, particularly hydroperoxides, which are known as anaerobic adhesives, sealing compounds, and the like. They are preferably used in solvent-free form for the above-mentioned purposes. The invention includes methods for the preparation of these compositions.

As essential components these systems contain reaction products of glycidyl-(meth)acrylate with linear half esters of dicarboxylic acids which are substantially free of epoxide groups. They can additionally contain (meth)acrylic esters of mono- or polyhydroxy alcohols, and organic peroxides or hydroperoxides, as well as small amounts of additional polymerizable compounds, and optionally other auxiliary substances. Preferably the half esters have a molecular weight between about 200 and 1800. To ensure a sufficiently rapid hardening in the absence of oxygen, accelerators may be added to the system.

RELATED ART

It is known that methacrylic esters or acrylic esters of various alcohols together with hydroperoxides yield mixtures which harden under exclusion of atmospheric oxygen and which can be used as adhesives and sealing compounds. If (meth)-acrylic esters of cycloaliphatic alcohols are used, considerably high tensile shearing strength values are obtained, which are important, e.g. for fastening shafts.

Furthermore, it is important that these anaerobically hardening adhesives yield firm bonds between the objects to be bonded, even at higher temperatures. Another requirement is that the cemented joint have good flexibility. Consequently, anaerobically hardening adhesives and sealing compounds must have a number of beneficial properties which are difficultly reconcilable with each other.

OBJECTS OF THE INVENTION

A principal object of the present invention is the development of an anaerobically hardening adhesive and sealing compound based on methacrylic- or acrylic esters and organic peroxides or hydroperoxides, as well as small amounts of additional polymerizable compounds and optionally other auxiliary substances, containing as an essential component reaction products of glycidyl-(meth)acrylate with linear half esters of dicarboxylic acids which are substantially free of epoxide groups.

Another object of the present invention is the development of an anaerobically hardening adhesive and sealing compound which polymerizes at room temperature; i.e. which hardens to an adhesive layer or sealing compound, yielding after a short time a loadable bond which is strong and shows good thermal stability and flexibility, even for non-ferrous materials, like aluminum and aluminum alloys.

Another object of the present invention is to provide a method for forming a strong, heat stable and flexible bond from the polymerization of an anaerobically hardening adhesive and sealing compound based on methacrylic-or acrylic esters and organic peroxides or hydroperoxides, as well as small amounts of additional polymerizable compounds and optionally other auxiliary substances, containing as an essential component reaction products of glycidyl-(meth)acrylate with linear half esters of dicarboxylic acids which are substantially free of epoxide groups.

These and other objects of the invention will become more apparent as the description thereof proceeds.

DESCRIPTION OF THE INVENTION

The present invention relates to novel anaerobically hardening adhesive and sealing compositions comprising (meth)acrylic esters and peroxide polymerization catalysts and as an essential component reaction products of glycidyl-(meth) acrylate with linear half esters of dicarboxylic acids which are substantially free of epoxide groups. The compositions may contain small amounts of one or more additional polymerizable compounds and other auxiliary substances, if desired, to optimize the properties of the compositions.

A special embodiment of the invention is an anaerobically setting adhesive and sealing composition comprising methacrylic- or acrylic esters, organic hydroperoxides, and optionally small amounts of additional polymerizable, unsaturated compounds, and ordinary auxiliary substances, which contain 10 to 90% by weight, based on the total weight of the polymerizable portions of the composition, of reaction products of glycidyl (meth)acrylate with linear half esters of dicarboxylic acids and diols which reaction products are substantially free of epoxide groups, wherein more than 1 mole of glycidyl (meth)acrylate is reacted per mole of the linear half ester of a dicarboxylic acid and a diol.

The half esters of dicarboxylic acids to be used as a starting material preferably have a molecular weight between about 200 and 1800, more preferably between 400 and 1200. They are prepared preferably by esterification of diols with dicarboxylic acids or dicarboxylic acid derivatives, particularly dicarboxylic acid anhydrides. Naturally, other methods leading to such half esters can also be used. To ensure that half esters are formed, a molar ratio of 1:2 of diol:acid anhydride must be used in the esterification.

The esterification is effected in known manner either in the melt or in inert solvents, with the possible addition of suitable catalysts, at temperatures between 50° and 150° C, preferably between 80° and 120° C, and optionally in an inert gas atmosphere, as e.g. nitrogen.

The diol component of the half esters can be any short-chain, straight- or branched-chain, saturated or unsaturated compound. Particularly suitable are the aliphatic diols, among which the alkane, alkene- and alkynediols are especially preferred. These diols can have 2–8, preferably 2–6, carbon atoms.

Examples of such diols are ethane diol, 1,3-propane diol, 1,2-propanediol, 1,4-butane diol, 1,2-butane diol, 1,3-butane diol, 2,3-butane diol, 1,5-pentane diol, 1,2-pentane diol, 1,6-hexane diol, 1,2-hexane diol, neopentyl glycol, butene-1,4-diol and butyne-1,4-diol.

The above diols can be used alone or in combination with each other. The combination of an alkynediol with an alkanediol may be mentioned as one example.

The dicarboxylic acid derived component of the half esters can be aliphatic, cycloaliphatic, aromatic, combinations of aromatic and aliphatic, and substituted groups thereof. The aliphatic and cycloaliphatic dicarboxylic acids and acid anhydrides can be saturated or unsaturated, preferably ethylenically unsaturated. The aromatic dicarboxylic acid or acid anhydride preferably contains at least one phenylene radical, most preferably one such radical.

Cyclic anhydrides of dicarboxylic acids having five- or-six membered rings are preferred.

Examples of suitable dicarboxylic acids or acid anhydrides are maleic acid anhydride, succinic acid anhydride, succinic acid, phthalic acid anhydride, cyclohexane dicarboxylic acid anhydride, maleic acid, tetrahydrophthalic acid anhydride, 1,2-cyclohexanedicarboxylic acid, and endomethylene-tetrahydrophthalic acid anhydride, etc.

These are preferably alkanedioic acids and acid anhydrides having 2 to 6 carbons in the alkane residue, alkenedioic acids and acid anhydrides having 2 to 6 carbon atoms in the alkene residue, benzene dicarboxylic acids and acid anhydrides, cycloalkane dicarboxylic acids and acid anhydrides having 5 to 8 carbons in the cycloalkane residue, cycloalkene dicarboxylic acids and acid anhydrides having 5 to 8 carbons in the cycloalkene residue, and endoalkylenecycloalkene dicarboxylic acids and acid anhydrides having 7 to 8 carbons in the endoalkylenecycloalkene residue.

As in the case of the diol component of the half ester, the dicarboxylic acid-derived component can be esterified alone or in a combination of two or more of such components. Mixtures of maleic acid anhydride and phthalic acid anhydride, e.g., have been found to be extremely useful.

In the production of the reaction products of glycidyl(meth) acrylate and half esters to be used for the adhesives and sealing compounds according to the invention, the glycidyl(meth)acrylate and the half ester are heated together, preferably in the presence of oxygen, as e.g. by passing air through the reaction mixture, at temperatures between 60° and 120° C, for about ½ to 8 hours.

Since polymerization cannot be completely excluded in the production of the above reaction products, particularly at elevated temperatures, it is advisable to add known polymerization inhibitors, like hydroquinone. Furthermore, alkaline catalysts can be used to reduce the reaction time. Suitable here are those compounds which dissolve easily in the reaction mixture, e.g. quaternary ammonium compounds, like trimethylbenzyl ammonium hydroxide, trimethylphenyl ammonium hydroxide, tetraethyl ammonium hydroxide, trimethylbenzyl ammonium ethoxide, trimethylbenzyl ammonium bromide, and the like.

In the specification and claims, the term "di(meth) acrylic esters" is used to designate the above-described reaction products of glycidyl(meth) acrylates and the half esters. The di(meth) acrylic esters can be characterized on the basis of known physical methods. They are colorless or yellow-colored, viscous substances which do not tend to polymerize in the cold.

The adhesives and sealing compounds according to the invention can contain up to 90% by weight of the above-mentioned di(meth) acrylic esters, based on the total weight of the polymerizable portions of the composition. According to a preferred embodiment, they additionally contain 10 to 40% by weight of cycloaliphatic, heterocyclic, or aliphatic (meth)acrylic esters, based on the total weight of polymerizable portions. These cycloaliphatic, heterocyclic or aliphatic (meth)acrylic esters can advantageously contain free OH-groups.

These cycloaliphatic, heterocyclic or aliphatic (meth)acrylic esters as components of anaerobic systems have been known for a long time. They are composed, for example, of (meth) acrylic esters of mono- or polyvalent alcohols, such as ethylene glycol; diethylene glycol; triethylene glycol; tetraethylene glycol; polyethylene glycol; glycerin; tri-methylol propane; pentanediol; di-, tri-, or tetrapropylene glycol; or the (meth) acrylic esters of dimerized or polymerized cyclopentadienol, tetrahydrofurfuryl alcohol, cyclopentanol, methylcyclopentanol, cyclohexanol, methylcyclohexanol, 1,3-dioxa-2,2-dimethyl-4-methylol-cyclopentane or 4-methylolcyclohexane. The reaction products of glycide esters of polyvalent phenols with acrylic acid or (meth) acrylic acid provide another group of anaerobically hardening adhesives. Those (meth) acrylic esters containing free OH-groups have been found to be very useful, as e.g. hydroxyethyl methacrylate, and 2-hydroxypropyl methacrylate. Satisfactory results are also obtained with esters produced by reacting (meth)acrylic acid with dimerized cyclopentadiene, i.e., (meth)acrylic acid esters of the isomeric dihydrodicyclopentadienols.

Examples of suitable monomethacrylates are tetrahydrofurfuryl methacrylate, 5,6-dihydrocyclopentadienyl-methacrylate, cyclohexyl methacrylate, ethylhexyl methacrylate, hydroxyethyl methacrylate, and hydroxypropyl methacrylate. Examples of suitable dimethacrylates are ethylene glycol dimethacrylate, triethylene glycol dimethacrylate and polyethylene glycol dimethacrylate.

Especially good results have been achieved using the monomethacrylates.

In a preferred embodiment, the compositions of the invention consist of 70–80% of the di(meth)acrylic ester and 20–30% mono(meth)acrylates based on the total weight of the polymerizable portions of the composition. A favorable effect on the properties of a cemented joint has also been realized by addition to the mixtures according to the invention of small amounts of polymerizable carboxylic acids containing double bonds, such as alkenoic acids having 3 to 6 carbon atoms, like methacrylic acid, acrylic acid, etc. in an amount of 0.1 to 5% by weight, based on the total weight of the polymerizable portions of the composition. Methacrylic acid has been found to be especially useful.

Another essential component of the anaerobically hardening compositions are the peroxide initiators. These are preferably hydroperoxides which derive from hydrocarbons with a chain length of 3 to 18 C-atoms. Suitable, for example, are cumene hydroperoxide, tert.-butyl hydroperoxide, methyl ethyl ketone hydroperoxide, and diisopropyl benzene hydroperoxide, especially cumene hydroperoxide. Furthermore those peroxides are also suitable which have a half life period of 10 hours at a temperature between about 80° and 140° C. Here we mention particularly tert.-butyl perbenzoate, di-tert.-butyl-diperoxyphthalate, 2,5-dimethyl-2,5-bis-(tert-butylperoxy)-hexane,bis-(1-hydroxy-cyclohexyl)-peroxide,tert-butyl-peroxyacetate, 2,5-dimethyl-hexyl-2,5-di-(peroxybenzoate), tert.-butylperoxy-isopropyl carbonate, n-butyl-4,4-bis-(tert.-butylperoxy) valerate, 2,2-bis-(tert.-butylperoxy)butane and di-tert.-butyl peroxide.

The peroxides should be present in an amount of 0.1% to 20%, preferably 1.0% to 10%, based on the total weight of the polymerizable portions of the compositions. They are used mostly as phlegmatized (i.e. thickened) solutions or pastes, that is, with a relatively low content of inert substances, for example, dimethyl phthalate, cumene or the like.

The adhesives may also contain small amounts of auxiliary compounds such as are customarily present in adhesives of this type, such as stabilizers and, if desired, accelerators.

According to a preferred embodiment of the invention, stabilizers are added to the anaerobically hardening mixtures, particularly if they contain arylalkyl- and/or dialkyl hydrazones. The stabilizers prevent premature polymerization, that is, they improve the stability of the compositions during storage. Beyond that, they have an accelerating effect on the polymerization of the (meth)acrylic esters under anaerobic conditions. The stabilizers thus possess a double function. Suitable substances which have these properties are, for example, aliphatic monopercarboxylic acids, preferably the alkyl monopercarboxylic acids with 2-8 carbon atoms in the alkyl radical, (particularly peracetic acid) and nitrones, like C-phenyl-N-methyl-nitrone. Aromatic per acids can also be used, such as perbenzoic acid and perphthalic acid. The use of small amounts (e.g., 0.05% to 5.0%, preferably 0.05 to 3%, by weight of the (meth-)acrylic esters) is generally sufficient.

In addition to the foregoing, the composition may contain a free radical stabilizer, to prevent gelations when oxygen alone is insufficient for the purpose. Quinones (for example, hydroquinone) are preferred stabilizers for this purpose. These quinone inhibitors can be used in concentrations of 100–1000 ppm, preferably 200–500 ppm, of the polymerizable portions of the compositions.

As a rule, the stabilizers are added as the last ingredient to the composition.

According to a preferred embodiment of the invention accelerators are added to the compositions. Suitable accelerators include organic amines, particularly tertiary amines, carboxylic hydrazides, N,N-dialkyl hydrazines, carboxylic sulfimides, and mercaptans such as octyl mercaptan or dodecyl mercaptan. The accelerators are generally present only in small quantities, (approximately 0.1% to 5% by weight of the polymerizable portions of the compositions). In this instance the compositions exhibit their best properties with reference to a fast setting time. As amines aliphatic or aromatic tertiary amines, for example, triethylamine, dimethylaniline, N,N-dimethyl-o-toluidine, N,N-dimethyl-p-toluidine, and tri-n-butylamine, are suitable. The hydrazides of acetic acid and of benzoic acid are examples of suitable hydrazides. Among the sulfimides, benzoic acid sulfimide is preferred.

Among other accelerators useful in the invention may be mentioned aromatic hydrazines, such as 4-nitrophenylhydrazine and 2,4-dinitrophenylhydrazine; hydrazones such as acetophenone hydrazone, benzaldehyde hydrazone, methyl ethyl ketone hydrazone, methyl isobutyl ketone hydrazone, and diacetyl hydrazone; sulfonyl hydrazones such as methyl ethyl ketone tosyl hydrazone, acetone tosylhydrazone, cyclohexanone tosyl hydrazone and acetoacetic ester tosyl hydrazone; organic disulfonamides, more especially diaromatic sulfonamides, such as di-p-tosylsulfonamide; and organic sulfonic acid hydrazides such as benzene-sulfonic acid hydrazide, and p-toluene sulfonic acid hydrazide. In the use of the accelerators mentioned in this paragraph it is helpful to use organic amines, as e.g. N,N-dimethyl-toluidine either as an auxiliary or principal accelerator. In this case the systems show their best properties regarding a rapid hardening time.

A class of particularly effective accelerators are the organic sulfohydrazides, especially the aryl sulfonic acid hydrazides. Preferred among these are benzenesulfonic acid hydrazide and p-toluenesulfonic acid hydrazide, most preferably p-toluenesulfonic acid hydrazide. These sulfohydrazide accelerators display special effectiveness in combination with tertiary amines, preferably N,N-dimethyl-p-toluidine.

The combination of a sulfohydrazide accelerator in combinations with a tertiary amine and peracetic acid as stabilizer is a very appropriate accelerator/stabilizer combination for the instant invention, as e.g. p-toluenesulfonic acid hydrazide in combination with N,N-dimethyl-p-toluidine and peracetic acid.

Accelerators and stabilizers must be added in amounts adjusted to each other to obtain optimum properties. They can be easily adapted to each other by simple preliminary tests to obtain an optimum hardening time and good stability. The components of the adhesive compositions of the present invention, including initiators, inhibitors, stabilizers, accelerators and esters, are mutually soluble or homogeneously dispersible.

An example of a preferred embodiment of the anaerobically hardening compositions of the invention consists of a di(meth)acrylic ester; mono(meth)acrylate(s), which can be substituted by free hydroxy group(s); a polymerizable carboxylic acid; an organic peroxide; an accelerator; and a stabilizer.

Furthermore, thickeners, softeners, plasticizers, inorganic fillers, and coloring matter can also be added to the adhesive and sealing compounds according to the invention. Suitable thickening agents are polymeric compounds based on styrene or (meth)-acrylic polymers such as the ester-soluble poly(lower alkyl) acrylates and methacrylates, as e.g. polymethyl methacrylate and polyethyl acrylate, and ester-soluble polyvinyl hydrocarbons such as polystyrene, as well as polyvinyl chloride, synthetic rubber and the like. They are generally used in amount sufficient to give the composition a paste-like viscosity.

Among the fillers and colorants may be mentioned, e.g. finely-divided silicon dioxide, silicates, such as calcium silicate, bentonites, calcium carbonate, and titanium dioxide; and soluble dyes in amounts appropriate for the purpose.

The adhesive and sealing compositions according to the invention are produced by mixing the components at room temperature. These compositions have excellent storage stability in air or oxygen. They are stable for months or years if they are kept in vessels that are permeable to air, like polyethylene bottles. They can further be stored in only partly-filled bottles of glass, polyethylene, etc., without undergoing any change, a relatively low oxygen-partial pressure sufficing to inhibit polymerization. The bottles can also be colored to keep out short-wave light, which has a favorable effect on the stability.

The anaerobically-hardening compositions of the present invention are used in the industry for cementing metal sheets or metal parts of different materials, as e.g. for the cementing of screws and bolts in their threads, the sealing of screw-connections, nipples, etc., the cementing of plug connections, the sealing of flanges, the assembly of intricate metal shapes, sealing pipe joints, etc. Assemblies of metals such as iron, brass, copper and aluminum can be bonded to each other. Small quantities of the adhesive compositions are introduced between the surfaces to be bonded, after which the surfaces are contacted with each other sufficiently firmly or in another manner so as to exclude air or oxygen. Then the compositions of the invention polymerize rapidly forming a firm bond. It is naturally also possible to accelerate the hardening with known means, as e.g. by heating the joint.

When the adhesives of the present invention are to be used for adhering or sealing glass or plastics or metals which are less catalytically active (for example, zinc, cadmium, high-alloyed steels and anodized aluminum), it is advantageous to pretreat these materials with metallic salt accelerators (for example copper naphthenate and cobalt napthenate).

Among the advantages of the adhesive and sealing compositions according to the present invention are the following. Elevated temperatures are not required for hardening. The parts joined together can after a short time already be subject to heavy loading. In addition to ferrous materials, aluminum parts can also be cemented together with good strength. The thermal stability and flexibility of the cemented joint is excellent. The adhesives and sealing compositions according to the invention are particularly suitable for joining metals where great strength, and good thermal stability and flexibility of the cemented joint are required.

In the specification and claims the terms "(meth)acrylate(s)" and "(meth)acrylic ester(s)" are used to designate esters of acrylic and esters of methacrylic acid. The esters of methacrylic acids are preferred. The esters are termed latent adhesives because they do not develop their adhesive properties until they have polymerized.

The invention is further described in the examples which follow. These examples are preferred embodiments of the invention and are not to be construed in limitation thereof.

TESTING METHODS

The anaerobically hardening compositions produced according to the following Examples 1-9, on subsequent pages 18 to 28 of this application, were subjected to the following tests:

(A) STABILITY TEST

In the stability test, test tubes of 10 cm length and 10 mm width were 9/10 filled with the mixtures according to Examples 1 to 8, and suspended in a bath kept at 80° C. The time interval from the suspension to the first formation of a gel was measured. All samples were still gel-free after 60 minutes.

(B) TENSILE SHEARING STRENGTH

The tensile shearing strength was measured (according to DIN 53283) using a tensile testing machine (feed = 20 mm/min) on steel plates (100 × 20 × 1.5 mm) which had been sand blasted at the place intended for the adhesive, and adhered to one another by means of the composition of the invention with a simple overlapping (DIN 1541/ST 1203) and on aluminum plates (DIN 1783, AlCuMg, 2 pl., 100 × 25 × 1.5 mm) which had been likewise adhered to one another with an overlapping length of 10 mm. The samples were tested as described above after hardening for 72 hours at room temperature.

(C) THERMAL STABILITY

In the thermal stability test a few drops of the anaerobically hardening adhesive were placed on the threads of a degreased bolt (M10X30DIN 933-8.8) and the appropriate nut (M10DIN 934-5.6) was screwed over the bolt. The cemented nut and bolt was allowed to harden for 3 days at room temperature and thereafter stored for 3 days in a drying oven at 150° C. The torque necessary to break the adhesive joint was then determined with a torque wrench.

(D) FLEXIBILITY IN BENDING TEST

For determining the flexibility of the samples a three-point bending test was used. Steel plates (DIN 1541 ST 1405, 100 × 20 × 0.88 mm) were adhered to one another by means of the composition of the invention with a simple overlap (2 cm$^2$) and, after hardening for 72 hours at room temperature, were bent in the center of the overlap over a mandrel (dia. 10 mm) until they broke. The angle at which the point came apart was measured. Such angle represents a measure of the flexibility of the cemented joint.

All the above tests were repeated 5 times. The mean values of the five measurements are given in the Examples which follow.

EXAMPLE 1

156.9 g (1.6 moles) of maleic anhydride were reacted in a reaction vessel under nitrogen with 49.6 g (0.8 mole) of ethylene glycol for 6 hours at 85° C. An acid number of 445 was attained. The yellow-colored viscous bis-maleic ester of ethylene glycol was then reacted at 80° C with 234 g of glycidyl-methacrylate in the presence of 200 ppm hydroquinone and 6.4 g of a 40% methanol solution of trimethylbenzyl ammonium hydroxide. Air was passed through the mixture during the reaction. After a reaction time of 6 hours the acid number was 5.2.

Using the dimethacrylic ester obtained as above, an anaerobically hardening cement of the following composition was prepared:

70 g of dimethacrylic ester
10 g of methacrylic ester of 5,6-dihydrodicyclopentadienol
10 g of hydroxyethyl methacrylate
0.5 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B-D and the following means values were obtained:

Tensile Shearing Strength on Steel: 270 kp/cm$^2$
Tensile Shearing Strength on Aluminum: 121 kp/cm$^2$
Thermal Stability: 300 kp cm Flexibility In Bending Test: 100 deg.

EXAMPLE 2

111.6 g (1.8 moles) of ethylene glycol were reacted under nitrogen with 235.2 g (2.4 moles) of maleic anhydride and 177.6 g (1.2 moles) of phthalic anhydride at 100° C. After 6 hours of reaction the acid number was 390. 80 g of the reaction product were reacted in the presence of 200 ppm hydroquinone and 0.48 g of a 40% solution of benzyltrimethyl ammonium hydroxide in methanol at 80° C with 79.5 g of glycidyl methacrylate. After 6 hours of reaction the acid number was 15.

Using the dimethacrylic ester obtained as above, an anaerobically hardening cement of the following composition was prepared:

70 g of dimethacrylic ester
20 g of hydroethyl methacrylate
0.5 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B-D and the following mean values were obtained:

Tensile Shearing Strength on Steel: 283 kp/cm$^2$
Tensile Shearing Strength on Aluminum: 122 kp/cm$^2$
Thermal Stability: 300 kp cm
Flexibility In Bending Test: 100 deg.

EXAMPLE 3

180 g (2 moles) of 1,4-butanediol were reacted with 392 g (4 moles) of maleic anhydride at 92° C under nitrogen. After three hours of reaction the acid number was 390. 143 g of the reaction product were reacted in the presence of 200 ppm hydroquinone and 0.85 ml of a 40% methanol solution of benzyltrimethyl-ammonium methoxide with 141 g of glycidylmethacrylate at 80° C. During the reaction air was passed through the solution. After a total reaction time of 6 hours the acid number was 7.5.

Using the dimethacrylic ester obtained as above, an anaerobically hardening cement of the following composition was prepared:

70 g of dimethacrylic ester
20 g of hydroxyethyl methacrylate
0.5 g of N,N-dimethyl-p-toluidine
5 g of a 70% solution of cumene hydroperoxide in cumene
1 g of a 40% solution of peracetic acid in acetic acid
3.5 g of methacrylic acid This anaerobically hardening cement was tested in accordance with the above described Testing Methods B-D and the following mean values were obtained:

Tensile Shearing Strength on Steel: 290 kp/cm$^2$
Tensile Shearing Strength on Aluminum: 111 kp/cm$^2$
Thermal Stability: 300 kp cm
Flexibility In Bending Test: 90 deg.

EXAMPLE 4

180 g (2 moles) of 1,4-butanediol were reacted with 262 g (2.65 moles) of maleic anhydride and 199.5 g (1.35 moles) of phthalic anhydride at 85° C under nitrogen. After 3.5 hours of reaction the acid number was 354. 80 g of the reaction product were reacted in the presence of 200 ppm hydroquinone and 0.15 g of a 40% methanol solution of benzyltrimethyl ammonium methoxide at 80° C. with 72 g of glycidyl methacrylate. During the reaction air was passed through the mixture. After a reaction time of 11 hours, the acid number was 8.6.

Using the yellow-colored transparent viscous liquid dimethacrylic ester obtained as above, an anaerobically hardening cement of the following composition was prepared:

70 g of dimethacrylic ester
20 g of hydroxyethyl methacrylate
0.5 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B-D and the following mean values were obtained:
Tensile Shearing Strength on Steel: 302 kp/cm$^2$
Tensile Shearing Strength on Aluminum: 132 kp/cm$^2$
Thermal Stability: 280 kp cm
Flexibility In Bending Test: 90 deg.

EXAMPLE 5

132 g (1.5 moles) of 2-butene-1,4-diol and 462 g (3.0 moles) of cyclohexane dicarboxylic anhydride were reacted under nitrogen at 100° C. After 12 hours of reaction the acid number was 295. 80 g of the reaction product were reacted in the presence of 200 ppm hydroquinone and 0.42 mole of a 40% methanol solution of benzyltrimethyl ammonium methoxide with 60 g of glycidyl methacrylate at 80° C. After 5 hours of reaction the acid number was 8.0 132 g of a yellow-colored viscous dimethacrylic ester were obtained.

Using the dimethacrylic ester obtained as above, an anaerobically hardening cement of the following composition was prepared:

70 g of dimethacrylic ester
20 g of tetrahydrofurfuryl methacrylate
0.25 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B-D and the following mean values were obtained:
Tensile Shearing Strength on Steel: 278 kp/cm$^2$
Tensile Shearing Strength on Aluminum: 123 kp/cm$^2$
Thermal Stability: 220 kp cm
Flexibility In Bending Test: 80 deg.

EXAMPLE 6

176 g (2 moles) of 2-butene-1,4-diol were esterified at 100° C under nitrogen with 261 g (2.66 moles) of maleic anhydride and 197 g (1.38 moles) of phthalic anhydride. After 6 hours of reaction the acid number was 350. 50 g of the reaction product were reacted in the presence of 200 ppm hydroquinone and 0.95 ml of a 40% methanolic benzyltrimethyl ammonium methoxide solution at 80° C with 47 g of glycidyl methacrylate. After 6 hours of reaction the acid number was 8.0. 90 g of a yellow, honey-like dimethacrylic ester were obtained.

Using the dimethacrylic ester obtained as above, an anaerobically hardening cement of the following composition was prepared:

70 g of dimethacrylic ester
10 g of tetrahydrofurfuryl methacrylate
10 g of hydroxyethyl methacrylate
0.25 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B–D and the following mean values were obtained:

Tensile Shearing Strength on Steel: 303 kp/cm$^2$
Tensile Shearing Strength on Aluminum: 124 kp/cm$^2$
Thermal Stability: 260 cm
Flexibility In Bending Test: 80 deg.

EXAMPLE 7

86 g (1 mole) of 2-butyne-1,4-diol and 90 g (1 mole) of 1,4-butanediol were esterified at 100° C under nitrogen with 261 g (2.67 moles) of maleic anhydride and 197 g (1.33 moles) of phthalic anhydride. 200 ppm hydroquinone were added as an inhibitor. After 4 hours of reaction the acid number was 350. 80 g of the yellow-colored viscous mixed half ester reaction product were reacted at 80° C with 71 g of glycidyl methacrylate. 1.51 ml of a 40% methanolic benzyltrimethyl ammonium methoxide solution were used as catalyst for this reaction, and in addition air was passed through the mixture. After 7 hours of reaction the acid number was 7.5. 135 g of a honey-like, transparent dimethacrylic ester were obtained.

Using the dimethacrylic ester obtained as above, an anaerobically hardening cement of the following composition was prepared:

70 g of dimethacrylic ester
20 g of 2-hydroxypropyl methacrylate
0.5 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B–D and the following mean values were obtained:

Tensile Shearing Strength on Steel: 332 kp/cm$^2$
Tensile Shearing Strength on Aluminum: 158 kp/cm$^2$
Thermal Stability: 260 kp cm
Flexibility In Bending Test: 70 deg.

EXAMPLE 8

86 g (1 mole) of 2-butyne-1,4-diol and 104 g (1 mole) of neopentyl glycol were reacted at 100° C under nitrogen with 262 g (2.67 moles) of maleic anhydride and 197 g (1.33 moles) of phthalic anhydride. 200 ppm hydroquinone were added as an inhibitor. After 6 hours of reaction the acid number was 354. 80 g of the yellow-colored viscous mixed half ester reaction product were reacted at 80° C with 72 g of glycidyl methacrylate. 1.53 ml of a 40% methanolic benzyltrimethyl ammonium methoxide solution were used as a catalyst for this reaction. After 3.5 hours of reaction the acid number was 8.4 145 g of a yellow-colored, viscous dimethacrylic ester were obtained.

Using the dimethacrylic ester obtained as above, an anaerobically hardening cement of the following composition was prepared:

70 g of dimethacrylic ester
20 g of hydroxyethyl methacrylate
0.25 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B–D and the following mean values were obtained:

Tensile Shearing Strength on Steel: 260 kp/cm$^2$
Tensile Shearing Strength on Aluminum: 129 kp/cm$^2$
Thermal Stability: 240 kp cm
Flexibility In Bending Test: 80 deg.

EXAMPLE 9

172 g (2 moles) of 2-butyne-1,4-diol were esterified at 100° C under nitrogen with 261 g (2.67 moles) of maleic anhydride and 197 g (133 moles) of phthalic anhydride. 200 ppm hydroquinone were added as an inhibitor. After 4 hours of reaction the acid number was 358. 80 g of the yellow-colored, medium-viscous reaction product were reacted at 80° C with 73 g of glycidyl methacrylate, after the addition of another 200 ppm of hydroquinone. 1.53 ml of a 40% methanolic benzyltrimethyl ammonium methoxide solution were added as a catalyst. During the reaction air was passed through the reaction mixture. After 5 hours of reaction the acid number was 8.0. 145 of a yellow-colored, honey-like dimethacrylate ester were obtained.

Using the dimethacrylic ester obtained as above, an anaerobically hardening cement of the following composition was prepared:

70 g of dimethacrylic ester
20 g of hydroxyethyl methacrylate
0.5 g of p-toluene sulfonic hydrazide
0.5 g of N,N-dimethyl-p-toluidine
5 g of a 70% solution of cumene hydroperoxide in cumene
1 g of a 40% solution of peracetic acid in acetic acid
3 g of methacrylic acid This anaerobically hardening cement was tested in accordance with the above described Testing Methods B–D and the following mean values were obtained:

Tensile Shearing Strength on Steel: 324 kp/cm$^2$
Tensile Shearing Strength on Aluminum: 153 kp/cm$^2$
Thermal Stability: 300 kp cm
Flexibility In Bending Test: 70 deg.

We claim:

1. An anaerobically setting adhesive and sealing composition comprising methacrylic- or acrylic esters, organic hydroperoxides, and optionally small amounts of additional polymerizable, unsaturated compounds, and ordinary auxiliary substances, which contain 10 to 90% by weight, based on the total weight of the polymerizable portions of the composition, of condensation reaction products of glycidyl (meth)acrylate with linear half esters of dicarboxylic acids and diols, prepared by esterification of dicarboxylic acids or dicarboxylic acid derivatives with diols in the molar ratio of 2:1, which reaction products of glycidyl (meth) acrylate with linear half esters are substantially free of epoxide groups, wherein more than 1 mole of glycidyl (meth) acrylate is reacted per mole of the linear half ester of a dicarboxylic acid and a diol.

2. The composition according to claim 1 which contains 10 to 40% by weight, based on the total weight of the polymerizable portions of the composition, of cycloaliphatic, heterocyclic, or aliphatic (meth)acrylic acid esters, which are optionally substituted by hydroxy groups and 60% to 90% by weight, based on the total weight of the polymerizable portions of the composition, of the other polymerizable portions of said composition.

3. The composition according to claim 1 wherein the half esters of dicarboxylic acids are derived from the reaction of a short straight- or branched-chain, saturated or unsaturated aliphatic diol or diols with aliphatic, cycloaliphatic, or aromatic dicarboxylic acids or acid anhydrides, the ratio of diol:acid or acid anhydride being about 1:2.

4. The composition according to claim 1 wherein the molar ratio of glycidyl (meth) acrylate to linear half ester is about 2 to 1.

5. The composition according to claim 3 wherein the diols are selected from the group consisting of alkanediols, alkenediols, or alkynediols, or any combination of said diols, said diols having from 2 to 8 carbon atoms.

6. The composition according to claim 2 which contains from 0 to 5% by weight, based on the total weight of the polymerizable portions of the composition, of a polymerizable carboxylic acid.

7. The composition according to claim 6 wherein the polymerizable carboxylic acid is selected from the group consisting of methacrylic acid and acrylic acid.

8. The composition according to claim 1 which additionally contains 0.05 to 3.0% by weight, based on the weight of (meth)acrylic esters, of a stabilizer.

9. The composition according to claim 8 wherein the stabilizer is peracetic acid.

10. The composition according to claim 1 which additionally contains an accelerator or accelerators.

11. The composition according to claim 1 which additionally contains an accelerator or accelerators and a stabilizer.

12. The composition according to claim 11 which contains p-toluenesulfonic acid hydrazide, N,N-dimethyl-p-toluidine and peracetic acid.

13. The composition according to claim 1 wherein the hydroperoxide is cumene hydroperoxide.

* * * * *